Patented Sept. 11, 1945

2,384,491

UNITED STATES PATENT OFFICE 2,384,491

METHOD OF TREATING VULCANIZED OILS

Karl Werner Posnansky, Stamford, Conn., assignor to The Stamford Rubber Supply Company, Stamford, Conn., a corporation of Connecticut No Drawing. Application June 25, 1941,
Serial No. 399,735

9 Claims. (Cl. 260—402.5)

This invention relates to vulcanized fatty oils, and more particularly to a method of modifying the physical properties of such oils in order to render them adaptable to a wide variety of uses in the art.

The vulcanization of fatty oils by mixing them with sulphur or other vulcanizing agent and subjecting them to heat for a suitable length of time has long been well known. By this method, according to the degree of vulcanization, either liquid viscous products or more or less solid elastic products can be produced. The former are known as partially vulcanized oils, while the latter, which are substantially completely vulcanized, are often referred to as rubber substitutes.

It is common to define the degree of thickening or hardening of such vulcanized oils by the relative extent to which they are soluble in acetone. The harder the product or the more complete the vulcanization, the smaller the percentage of the product which is soluble in acetone, in most cases.

It has been found that, in order to obtain a product with a relatively low acetone solubility, solely by vulcanization, the prolonged treatment necessary often has a disadvantageous effect on the color or quality of the product.

I have discovered that vulcanized fatty oils can, according to the degree of vulcanization, be thickened, solidified or hardened by treating them with basic chemical substances. The effect of such treatment on the previously vulcanized oil has the appearance of a more or less rapid polymerization, but the exact nature of the chemical reaction is not accurately known. Whatever the actual reaction may be, I have found that the treatment of vulcanized oils with basic chemical substances as above mentioned results in a measurable change in the physical and perhaps chemical properties of the vulcanized product. This change in properties can readily be determined by such tests as are commonly used in comparing viscosity, hardness, or acetone solubility.

If the product treated is a partially vulcanized liquid oil, the result is an increase in its viscosity.

If the product contains a higher percentage of vulcanizing agent, but in which vulcanization has been interrupted before actual solidification, the treatment with basic chemical substances results in a rapid change from a viscous liquid to a firm and elastic body.

Finally, if the product treated is a substantially completely vulcanized solid elastic rubber substitute, the treatment results in increased hardness or dryness and in a corresponding decrease in the acetone soluble portion of the material in most cases.

My improved process affords a means for increasing the viscosity of partially vulcanized oils without raising the sulphur content. In the case of completely vulcanized oils, it is frequently desirable to produce a product of low acetone solubility for use as compounding ingredients in the rubber industry, and my improved process makes possible the production of such low solubility products without the necessity for prolonging the vulcanization step to a point where it is commercially objectionable.

In carrying out my improved process, I first vulcanize the oil to the desired degree by the usual or any desired method, and thereafter treat the vulcanized oil with a basic chemical, as hereinafter more fully described.

I have found that both organic and inorganic chemical compounds of an alkaline or basic nature can be employed for the purpose of producing the results above referred to. I have further found that basic nitrogen compounds are particularly effective.

The wide range of possible materials is illustrated by the following list of some of the basic chemical compounds which may be successfully employed, namely:

Inorganic materials, such as hydroxides of both the alkali and alkaline earth metals.

Salts of the alkali metals with weak acids.

Ammonia.

Hydroxyl amine.

Organic materials, including organic compounds of nitrogen containing a hydroxyl group, such as: alkyl derivatives of hydroxyl amine, quaternary alkyl ammonium hydroxides.

Organic amines and their derivatives, either primary, secondary, or tertiary, simple or mixed, and of both the alkyl chain type and cyclic structure, including aniline, the piperidines and piperazines; also benzidine and phenylene diamine.

Hydrazines or di-amines.

Other oxygen-free organic nitrogen compounds, as for example, quanidine and its derivatives.

Certain alkaline nitrogen compounds, containing oxygen, such as the aldehyde ammonias and aldehyde amines.

It will be seen that some of the above mentioned basic chemicals are normally gaseous, some are liquid, and some are dry solids. The choice of the particular basic substance to be used in any given case will be influenced by the questions of solubility or miscibility of the material in or with the vulcanized oil, by the degree to which it is desired that the reaction shall take place, and by the properties which the basic substance might impart to the treated product.

The procedure for carrying out my invention is, in most cases, very simple. If the oil to be treated is only partially vulcanized and therefore in a liquid state, I may admix the basic substance in powdered, liquid or dissolved form by stirring it into the oil, or, if the basic substance is in the form of a gas, passing it through the oil in bubbles.

If the oil to be treated is more completely vulcanized and is in a substantially solid state, it should first be pulverized before being mixed with the basic chemical.

I find that in most cases, the reaction with the chemical substance takes place at room temperature. However, the mixture of oil and basic chemical may be heated to accelerate or intensify the reaction, if desired.

It will be understood that there is no limit as to the kinds or types of fatty oil that may be treated in accordance with the invention, and that no particular method of vulcanization is required. Either sulphur, sulphur compounds or other vulcanizing agents may be employed, with or without accelerators or activators. Furthermore, the vulcanized oils may be mixed with any desired fillers or softeners, both organic and inorganic.

I am aware that it has heretofore been proposed to treat with alkaline substances oils which have been vulcanized by the use of halogen sulphur compounds, such as sulphur chloride, for the purpose of neutralizing any acid which may be formed by the chlorine. In the present invention, however, the addition of alkaline substances to the vulcanized oils is not for the purpose of neutralizing any acid which may be present, but for the purpose of producing a thickening or hardening of the oils. In fact, the present invention is particularly applicable to oils which have been vulcanized by means of sulphur alone.

One of the valuable applications of the invention is for the purpose of covering metal or fabric articles with a solid protective film of hardened vulcanized oil. For this purpose, I employ a highly sulphurized oil in which the vulcanization has been interrupted before solidification occurs, and which is therefore in the form of a viscous liquid. This liquid is then applied as a coating on the surface of the metal or fabric article, and such coating is then solidified by exposing the coated article to the action of a basic compound. One of the most convenient compounds for this purpose is ammonia. The coated article may be exposed to an atmosphere of gaseous ammonia or may be immersed in an aqueous solution thereof. Or, as an alternative method, the basic compound may be mixed with the vulcanized oil immediately before it is applied as a coating.

The invention is well illustrated but, of course, not limited, by the following examples:

Example 1

100 parts of rapeseed oil are heated with 17 parts of sulphur at 260°–280° F., with slow agitation, until a cooled sample shows no separation of sulphur from the mixture. This viscous oil is then mixed with 3% potassium hydroxide, and, after standing 24 hours at room temperature, is converted into a gel.

Example 2

100 parts of castor oil are heated with 13 parts of sulphur at about 280° F., with agitation, until a cooled sample shows no separation of sulphur. The still liquid mixture is then cooled and admixed with 3% of strontium hydroxide. After standing at room temperature for 24 hours, the oil is converted into a gel.

Example 3

The oil and sulphur mixture of Example 1 is mixed with 5% sodium carbonate, instead of potassium hydroxide, but with similar results.

Example 4

The oil and sulphur mixture of Example 1 is mixed with ½% of piperazine, and allowed to stand at room temperature, with similar results.

Example 5

100 parts of rapeseed are heated with 5 of sulphur for four hours at 300° F. and allowed to cool. At room temperature, a current of ammonia gas is passed through the liquid vulcanizate for 30 minutes with agitation, and then the excess ammonia removed by heating to 150° F. This treatment produces a very considerable increase in viscosity.

Example 6

100 parts of rapeseed oil are heated with 17 parts of sulphur to 260°–280° F. with slow agitation until a cooled sample shows no separation of sulphur from the mixture. This viscous oil is then mixed with 20 parts of clay and 3 parts of triethanolamine and immediately poured into a mold. The mixture solidifies in the mold on standing.

Example 7

Instead of pouring into a mold, the viscous oil of the foregoing example is applied as a thin coating to a metal article by dipping, spraying or brushing. The coated metal is then placed in a closed vessel which is first evacuated and then filled with ammonia gas. After 20 to 30 minutes, the coated article is taken out of the vessel and the coating has been converted into a solid protective film.

Example 8

Instead of metal, as in the foregoing example, cloth is dipped into the vulcanized oil mixture so as to become saturated therewith, and is then dipped into a concentrated (27%) ammonia solution for 20 minutes. At the end of this time, the oil has been converted into a substantially solid coating.

Example 9

A fully vulcanized rubber substitute consisting of 100 parts of rapeseed oil and 23 parts of sulphur is pulverized and thoroughly mixed with two parts of ethylene diamine. After a period of 24 hours at room temperature, it is found that the acetone soluble portion of said rubber substitute has decreased from 9% to 6%.

Example 10

Same as the preceding example, except that instead of ethylene diamine, the basic material employed is butyl amine, which is also a liquid at room temperatures.

*Example 11*

Same as Example 10 except that the pulverized rubber substitute is mixed with an approximately equal quantity of concentrated ammonia solution. After one hour, the ammonia is removed by filtering, pressing and evaporating.

*Example 12*

Same as Example 9 except that the rubber substitute consists of 100 parts of castor oil and 13 parts of sulphur. In this case, the rubber substitute, treated with two parts of ethylene diamine for 24 hours, at room temperatures, will show an acetone soluble portion of only 20%, as compared with 30% before treatment.

While the above examples mention specifically only rapeseed and castor oil, I find that substantially the same methods are also applicable to a large number of other fatty oils, such as corn oil, soya oil, cottonseed oil, etc.

Patent No. 2,083,549 to Auer and Stamberger describes the use of an ammonia solution with an emulsion of a partially vulcanized oil. It appears that the ammonia solution is used as a stabilizing agent for the emulsion. In the carrying out of the present invention, however, the vulcanized oil is subjected directly to treatment with the ammonia or other basic chemical substance, without emulsification and in the absence of any emulsifying agent. In many instances, my improved treatment takes place in the absence of water or any aqueous solution. The presence of water is not necessary for the reaction of the invention but in some cases may be used as a matter of convenience.

What I claim is:

1. In the manufacture of vulcanized oil products from fatty oils, the steps which comprise first mixing said fatty oil with sulphur and heating until the desired degree of vulcanization is obtained, and thereafter treating the vulcanized fatty oil at room temperature with a chemical substance of a basic nature, until the vulcanized oil is appreciably hardened.

2. In the manufacture of vulcanized oil products from fatty oils, the steps which comprise first mixing said fatty oil with sulphur and heating until the desired degree of vulcanization is obtained, and thereafter treating the vulcanized fatty oil at room temperature with a basic ammonia derivative, until appreciably thickened.

3. In the manufacture of vulcanized oil products from fatty oils, the steps which comprise first mixing said fatty oil with sulphur and heating until vulcanization is completed to the desired degree, and thereafter treating the vulcanized fatty oil substantially at room temperature with a chemical substance of a basic nature, until the acetone soluble portion of the vulcanized oil is substantially decreased.

4. In the manufacture of vulcanized oil products from fatty oils, the steps which comprise first mixing said fatty oil with sulphur and heating until the desired degree of vulcanization is obtained, and thereafter treating the vulcanized fatty oil substantially at room temperature with a basic nitrogen compound, until substantially thickened.

5. In the manufacture of vulcanized oil products from fatty oils, the steps which comprise first mixing said fatty oil with sulphur and heating until the desired degree of vulcanization is obtained, and then treating the vulcanized fatty oil substantially at room temperature with ammonia, until the hardness of the vulcanized oil is substantially increased.

6. The method which consists in first mixing a fatty oil with sulphur and heating until the oil is partially vulcanized but still liquid, and thereafter treating said partially vulcanized liquid fatty oil at room temperature with ammonia until substantially solidified.

7. The method which consists in first mixing a fatty oil with sulphur and heating until the oil is partially vulcanized but still liquid, and thereafter subjecting said partially vulcanized liquid fatty oil at room temperature to the action of dry ammonia gas, until substantially solidified.

8. The method which consists in first mixing a fatty oil with sulphur and heating until the oil is partially vulcanized and thereafter treating said partially vulcanized oil substantially at room temperature with a basic ammonium compound until appreciably hardened.

9. The method of changing the physical nature of a fatty oil which consists in first mixing said oil with sulphur and heating until the desired degree of vulcanization is obtained, and thereafter treating said vulcanized oil substantially at room temperature with a basic organic amine.

KARL W. POSNANSKY.